DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 8

T901,008
ELECTRON BEAM RECORDING PHOTOGRAPHIC MATERIAL

Raymond F. Reithel, Kodak Park Works, 2000 Lake Ave., Rochester, N.Y. 14615

Filed May 28, 1971, Ser. No. 148,137
**Int. Cl. G03c *1/76***
U.S. Cl. 96—67
No Drawing. 9 Pages Specification

The recording material includes a support such as paper or polymeric photographic supports carrying a layer of metallic conducting material, e.g. aluminum or nickel and coated thereon a mixture of bivalent ions, such as provided by zinc acetate, and a tetrazolium salt. The metallic layer catalyzes the formation of a formazan dye image upon exposure of the element to an electron beam including laser beams so an image is obtained having higher density than obtainable in absence of the metallic conducting layer and bivalent ions. The rate of formation of the dye enhancement is accelerated by heat. In one example, an aluminum coated polyester support is coated with a mixture of a polyamide binder, zinc acetate and 2,3,5-triphenyl-2H-tetrazolium chloride. An image is obtained by exposure to a 15 kv., 50 na. electron gun source using about $1.6\times10^{-9}$ coulombs current exposure and post-exposure processing at 150° C. for 5 seconds. The above subject matter may be embodied in patent applications pending in foreign countries.